United States Patent
Kim et al.

(10) Patent No.: US 7,912,146 B2
(45) Date of Patent: Mar. 22, 2011

(54) METHOD AND APPARATUS FOR TRANSMITTING DATA IN A COMMUNICATION SYSTEM

(75) Inventors: Eung-Sun Kim, Suwon-si (KR); Jong-Hyeuk Lee, Seongnam-si (KR); Jong-Hyung Kwun, Seoul (KR)

(73) Assignee: Samsung Electronics Co., Ltd (KR)

( * ) Notice: Subject to any disclaimer, the term of this patent is extended or adjusted under 35 U.S.C. 154(b) by 1137 days.

(21) Appl. No.: 11/546,667

(22) Filed: Oct. 12, 2006

(65) Prior Publication Data

US 2007/0098095 A1 May 3, 2007

(30) Foreign Application Priority Data

Oct. 12, 2005 (KR) .................. 10-2005-0096267

(51) Int. Cl.
*H04L 27/00* (2006.01)
(52) U.S. Cl. ........ 375/295; 375/219; 370/203; 370/204; 370/208; 370/343; 370/329; 370/342
(58) Field of Classification Search .................. 375/25; 370/203, 204, 208, 343, 329, 342
See application file for complete search history.

(56) References Cited

U.S. PATENT DOCUMENTS

| 6,377,632 | B1 | 4/2002 | Paulraj et al. | |
|---|---|---|---|---|
| 6,834,043 | B1 | 12/2004 | Vook et al. | |
| 7,680,200 | B2 | 3/2010 | Kwun et al. | |
| 2004/0081073 | A1* | 4/2004 | Walton et al. | 370/204 |
| 2005/0058212 | A1* | 3/2005 | Shao | 375/260 |

FOREIGN PATENT DOCUMENTS

KR  1020060102185  9/2006

* cited by examiner

*Primary Examiner* — David C Payne
*Assistant Examiner* — Zewdu Kassa
(74) *Attorney, Agent, or Firm* — The Farrell Law Firm, P.C.

(57) ABSTRACT

A method and apparatus for transmitting data in a communication system. In the apparatus, a repeater repeatedly processes an input signal a predetermined number of times. A Space-Frequency Block-Coded (SFBC) encoder performs SFBC coding on the repeatedly processed input signals, and outputs at least two signal blocks in parallel. A cyclic prefix (CP) inserter inserts a CP in the signal blocks and transmits the CP-inserted signal blocks via associated transmission antennas using a single carrier.

16 Claims, 8 Drawing Sheets

METHOD AND APPARATUS FOR TRANSMITTING DATA IN A COMMUNICATION SYSTEM

PRIORITY

This application claims the benefit under 35 U.S.C. §119 (a) of an application filed in the Korean Intellectual Property Office on Oct. 12, 2005 and assigned Serial No. 2005-96267, the entire contents of which are incorporated herein by reference.

BACKGROUND OF THE INVENTION

1. Field of the Invention

The present invention generally relates to signal transmission in a communication system, and in particular, to a data transmission method and apparatus capable of compensating for distortion caused by fast fading in a communication system that uses a Space-Frequency Block-Coded (SFBC) scheme and a single carrier.

2. Description of the Related Art

In the next generation multimedia communication system now under research, as there is an increasing demand for a high-speed communication system capable of processing and transmitting a variety of information such as video and wireless data beyond early voice-oriented services, it is necessary to increase efficiency of communication systems by using a proper channel coding scheme. In addition, communication systems should transmit signals over a channel at high efficiency and reliability.

Meanwhile, wireless channel environments in wireless communication systems, unlike wire channel environments, suffer a loss of information as errors occur due to various causes such as multi-path interference, shadowing, propagation attenuation, time-varying noise, interference, fading, etc. A Frequency-Domain Equalization (FDE) scheme has been proposed as a technique for removing interference in the wireless channel environments.

In addition, a single-carrier transmission scheme based on the FDE scheme has recently been adopted as a standard for the broadband wireless Metropolitan Area Network (MAN) system, such as Institute of Electrical and Electronics Engineers (IEEE) 802.16 and European Telecommunications Standards Institute (ETSI) Hiper MAN. Further, a Single Carrier Frequency-Domain Equalization (SC-FDE) scheme having the similar structure and performance to that of the Orthogonal Frequency Division Multiplexing (OFDM) scheme, is robust against non-linear distortion or synchronization of carriers, and can reduce system complexity of a user terminal for uplink transmission even through simple signal processing at a transmitter.

Also, there has been proposed a transmission diversity technique that can increase channel capacity and link reliability by spatially arranging several transmission antennas without increasing a frequency bandwidth or transmission power. Recently, an SC-FDE scheme to which a Space Time Block Code (STBC) scheme for providing a transmission diversity gain is applied has been proposed.

FIG. 1 shows an STBC transmission sequence used for transmitting signals via two antennas using an STBC scheme according to the prior art. Referring to FIG. 1, the STBC transmission sequence sequentially transmits symbol blocks 110, 120, 130 and 140 via two antennas 101 and 103 in the time domain, and inserts cyclic prefixes (CPs) 112, 122, 132 and 142 between the symbol blocks 110, 120, 130 and 140 as guard intervals. The channel state should be constant between two symbol blocks, i.e. an $n^{th}$ block 110 (or 130) and an $(n+1)^{th}$ block 120 (or 140), transmitted through each of the two antennas 101 and 103. However, the SC-FDE scheme to which the STBC scheme is applied, can guarantee its performance because the constant channel state between symbol blocks is maintained in the slow fading environment, but the scheme has a limitation in performance guarantee in the fast fading environment.

However, the SFBC scheme, although it is robust against the fading environment as compared with the STBC scheme, cannot be directly applied to the single-carrier system because it is a multi-carrier scheme that applies block codes to adjacent sub-channels or adjacent sub-carriers. In particular, the channel state between adjacent sub-carriers should be constant, in order for the SFBC scheme to guarantee its performance.

SUMMARY OF THE INVENTION

It is, therefore, an object of the present invention to provide a method and apparatus for transmitting data in a communication system.

It is another object of the present invention to provide a method and apparatus for transmitting data through a single carrier in a communication system using SFBC.

According to one aspect of the present invention, there is provided a method for transmitting data in a communication system. The method includes repeatedly processing an input signal a number of times; performing SFBC coding on the repeatedly processed input signals and outputting at least two signal blocks in parallel; and inserting a CP in the signal blocks and transmitting the CP-inserted signal blocks via associated transmission antennas using a single carrier.

According to another aspect of the present invention, there is provided an apparatus for transmitting data in a communication system. The apparatus includes a symbol mapper for mapping input information bits to a symbol; a repeater for repeatedly processing symbols output from the symbol mapper a number of times; a demultiplexer for demultiplexing symbols output from the repeater; a symbol processing module for processing parallel symbols output from the demultiplexer and outputting at least two SFBC-coded signal blocks in parallel; and a CP inserter for inserting a CP in signal blocks output in parallel from the symbol processing module.

According to further another aspect of the present invention, there is provided an apparatus for transmitting data in a communication system. The apparatus includes a repeater for repeatedly processing an input signal a number of times; an SFBC encoder for performing SFBC coding on the repeatedly processed input signals, and outputting at least two signal blocks in parallel; and a CP inserter for inserting a CP in the signal blocks and transmitting the CP-inserted signal blocks via associated transmission antennas using a single carrier.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a method and apparatus for transmitting data in a communication system. In addition, the present invention provides a scheme for transmitting/receiving data with a single carrier in a communication system using a Space-Frequency Block-Coded (SFBC) scheme. In particular, the present invention provides a data transmission/reception scheme for compensating for distortion of data in the fast fading environment and allowing a transmitter to transmit data to a plurality of receivers without increasing complexity of the transmitter, thereby improving system performance.

Figure 1:
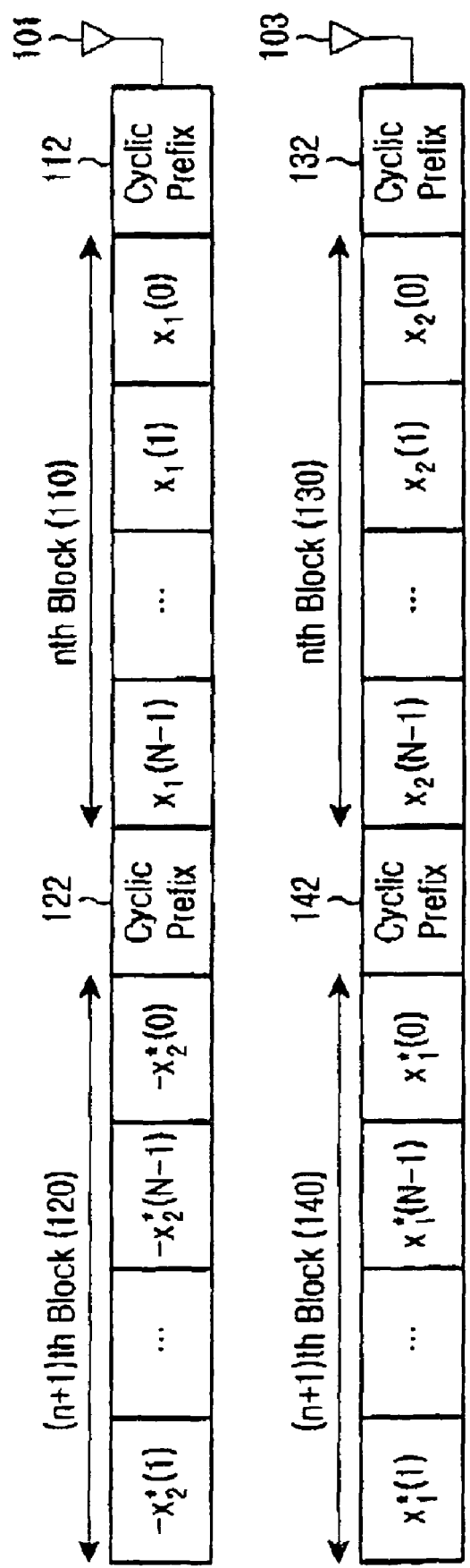
FIG. 1 is a diagram illustrating a structure of an STBC transmission sequence according to the prior art.
Figure 2:
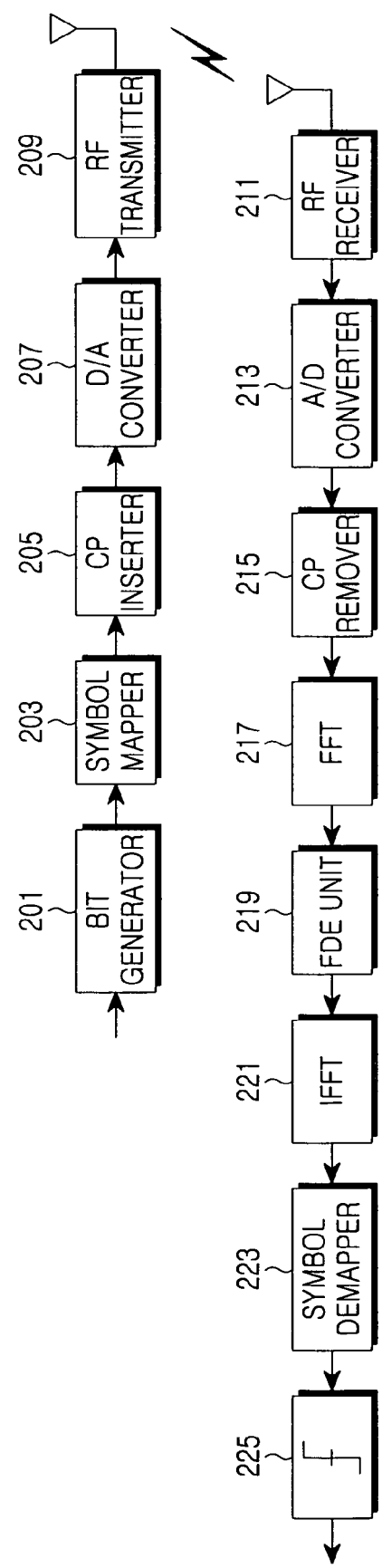
FIG. 2 is a diagram illustrating a configuration of a Single Carrier Frequency-Domain Equalization (SC-FDE) communication system with a single transmission antenna.

FIG. 2 shows a Single Carrier Frequency-Domain Equalization (SC-FDE) communication system with a single transmission antenna according to the present invention. Referring to FIG. 2, the communication system includes a transmitter and a receiver. The transmitter includes a bit generator 201 for generating information bits upon receipt of data to be transmitted to a receiver, a symbol mapper 203 for mapping a bit stream output from the bit generator 201 to a fixed-length symbol, a cyclic prefix (CP) inserter 205 for inserting a CP in the symbol output from the symbol mapper 203, a digital-to-analog (D/A) converter 207 for converting the digital signal output from the CP inserter 205 into an analog signal, and a radio frequency (RF) transmitter 209 for transmitting the signal output from the D/A converter 207 using an RF frequency.

The receiver includes an RF receiver 211 for receiving a signal from the transmitter over a wireless channel, an analog-to-digital (A/D) converter 213 for converting the analog signal output from the RF receiver 211 into a digital signal, a CP remover 215 for removing a CP from the digital signal output from the A/D converter 213, a Fast Fourier Transform (FFT) unit 217 for performing an FFT process on the signal output from the CP remover 215, an FDE unit 219 for performing an FDE process on the signal output from the FFT unit 217, an Inverse Fast Fourier Transform (IFFT) unit 221 for performing an IFFT process on the signal output from the FDE unit 219, a symbol demapper 223 for demapping the symbol output from the IFFT unit 221 into a bit stream, and a signal determiner 225 for determining a transmission signal for the bit stream output from the symbol demapper 223.

A description will now be made of a single-carrier communication system with two transmission antennas and one reception antenna, which transmits/receives SFBC signals based on the FDE scheme shown in FIG. 2.

Figure 3:
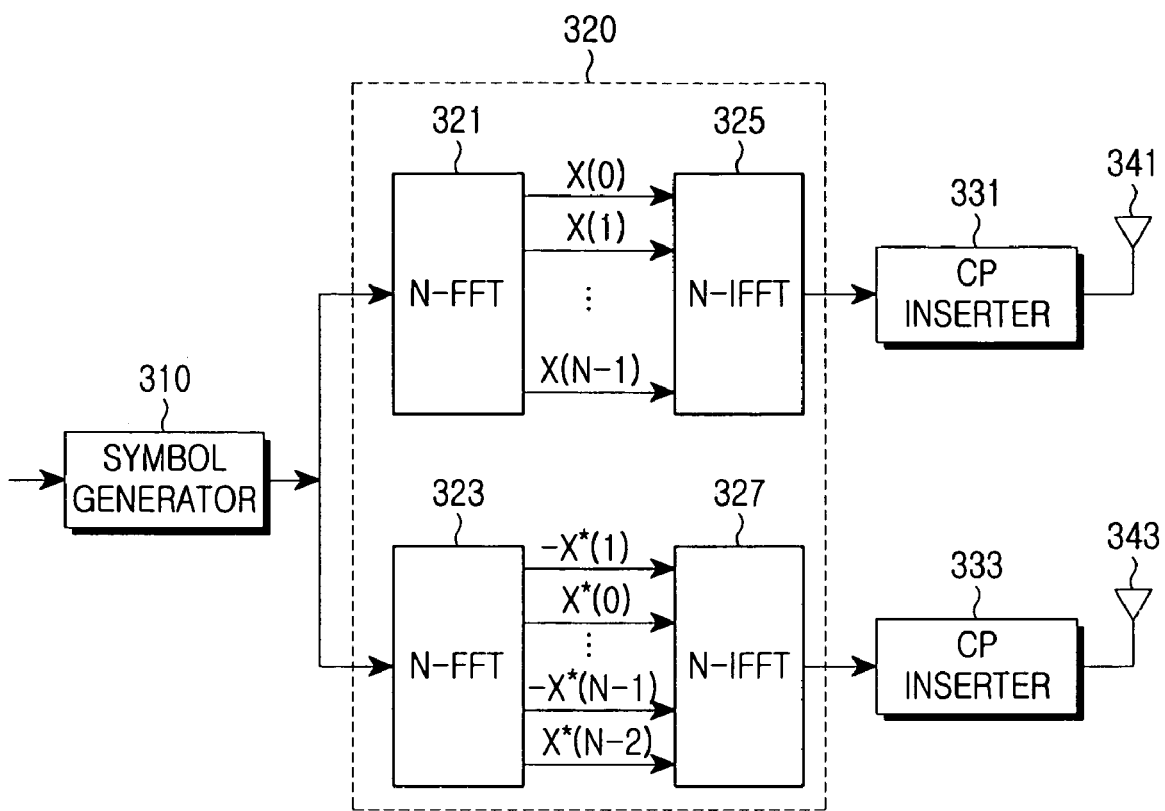
FIG. 3 is a diagram illustrating a structure of a transmitter in a communication system using an SFBC scheme.

FIG. 3 shows a transmitter in a communication system with two antennas. Referring to FIG. 3, if the data to be transmitted to a user, i.e. the data to be transmitted to the receiver, is input to the bit generator 201 of the transmitter shown in FIG. 2, the bit generator 201 outputs a bit stream to the symbol mapper 203. The symbol mapper 203 maps the bit stream to a fixed-length symbol and then delivers the mapped bit stream to a symbol generator 310. The symbol generator 310 then outputs symbols. The symbols output from the symbol generator 310 are processed into two signal streams by a signal processor 320 including a pair of FFT units 321 and 323 and a pair of IFFT units 325 and 327 associated with the FFT units 321 and 323. A CP is inserted in each signal stream by an associated CP inserter 331 and 333), and the CP-inserted signal stream is transmitted via an associated transmission antenna 341 and 343).

The signal transmission of the transmitter represents transmission in a time band other than a frequency band, and because the communication system processes the transmission sequence in the time band in such a way, the signal processor 320 introduces the concept in which the communication system generates single-carrier transmission signals in the time band using the SFBC scheme. Of the two signal streams output from the pair of the FFT units 321 and 323, the signal stream X(0), X(1), ..., X(n−2), X(n−1) corresponding to the first antenna 341 and the signal stream −X*(1), X*(0), ..., −X*(n−1), X*(n−2) corresponding to the second antenna 343 are conjugate to each other.

If an $n^{th}$ symbol of a signal block transmitted from an $i^{th}$ antenna is denoted by $x_i(n)$, a symbol $x_1(n)$ transmitted via the first antenna 341 and a symbol $x_2(n)$ transmitted via the second antenna 343 can be expressed as Equation (1)

$$x_1(n) = \frac{1}{\sqrt{2}}\left(x^e\left((n)_{\frac{N}{2}}\right) + W_N^{-n}x^0\left((n)_{\frac{N}{2}}\right)\right), n = 0, 1, \ldots, N-1 \quad (1)$$

$$x_2(n) = \frac{1}{\sqrt{2}}\left(-x^0\left((-n)_{\frac{N}{2}}\right)^* + W_N^{-n}x^e\left((-n)_{\frac{N}{2}}\right)^*\right),$$

$$n = 0, 1, \ldots, N-1$$

In Equation (1), $x^e(n)$ and $x^o(n)$ are defined as shown in Equation (2), and the $x^e(n)$ and the $x^o(n)$ have a period of N/2 for n. In addition, $W_N$ is defined as $$W_N = e^{-j\frac{2\pi}{N}}.$$

$$x^e(n)=x(2n), x^o(n)=x(2n+1), n=0, 1, \ldots, N/2-1 \quad (2)$$

In this way, the transmitter transmits the symbols shown in Equation (1) via the first antenna 341 and the second antenna 343 using a single carrier. From the symbols transmitted, in particular, via the second antenna 343, the transmitter can determine that the communication system transmits signals using the SFBC scheme.

Figure 4:
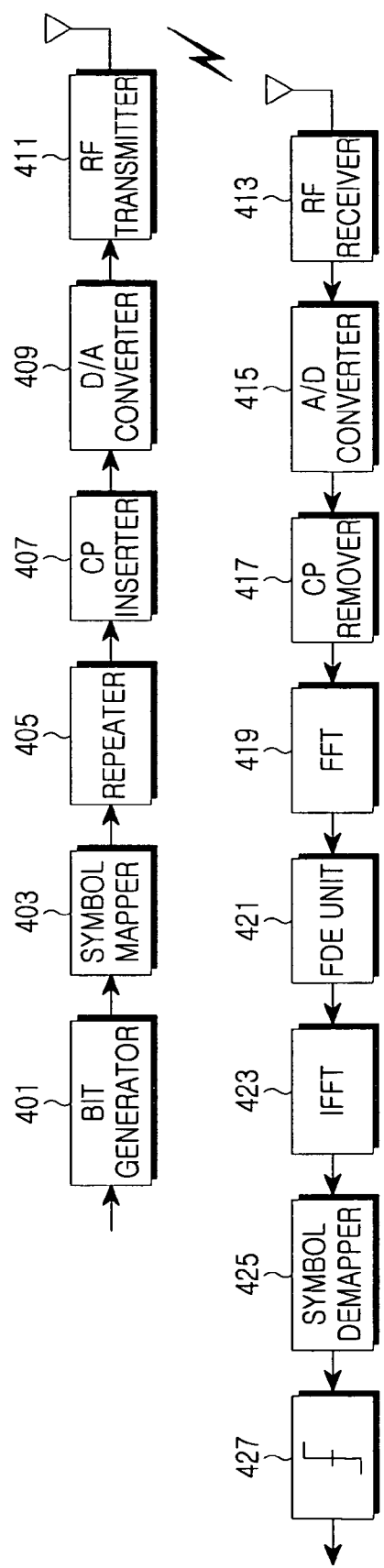
FIG. 4 is a diagram illustrating a configuration of an SC-FDE communication system with a single transmission antenna according to the present invention.

FIG. 4 shows a Single Carrier Frequency-Domain Equalization (SC-FDE) communication system with a single transmission antenna according to the present invention. Referring to FIG. 4, the communication system includes a transmitter and a receiver. The transmitter includes a bit generator 401 for generating information bits, a symbol mapper 403 for mapping a bit stream output from the bit generator 401 to a fixed-length symbol, a repeater 405 for repeatedly processing the symbols output from the symbol mapper 403 a number of times so the symbols are spaced apart at regular intervals and symbols of other information are inserted in the spaced intervals, a cyclic prefix (CP) inserter 407 for inserting a CP in the symbols output from the repeater 405, a digital-to-analog (D/A) converter 409 for converting the digital signal output from the CP inserter 407 into an analog signal, and a radio frequency (RF) transmitter 411 for transmitting the signal output from the D/A converter 409 using an RF frequency.

The repeater 405 repeatedly processes a symbol block generated by collecting input symbols, and the number of repeated processes (hereinafter referred to as "the number of repetitions") corresponds to the number of users whose signals the communication system can simultaneously process. The symbol block input to the repeater 405 and the symbol block output from the repeater 405 exist at the same time. That is, the repeater 405, while repeatedly processing the symbol block, reduces a sample time of the samples constituting each symbol block by the number of repetitions so the input symbol block and the output symbol block of the repeater 405 may exist at the same time.

The receiver includes an RF receiver 413 for receiving a signal from the transmitter over a wireless channel, an analog-to-digital (A/D) converter 415 for converting the analog signal output from the RF receiver 413 into a digital signal, a CP remover 417 for removing a CP from the digital signal output from the A/D converter 415, a Fast Fourier Transform (FFT) unit 419 for performing an FFT process on the signal output from the CP remover 417, an FDE unit 421 for performing an FDE process on the signal output from the FFT unit 419, an Inverse Fast Fourier Transform (IFFT) unit 423 for performing an IFFT process on the signal output from the FDE unit 421, a symbol demapper 425 for demapping the symbol output from the IFFT unit 423 into a bit stream, and a signal determiner 427 for determining a transmission signal for the bit stream output from the symbol demapper 425.

Figure 5:
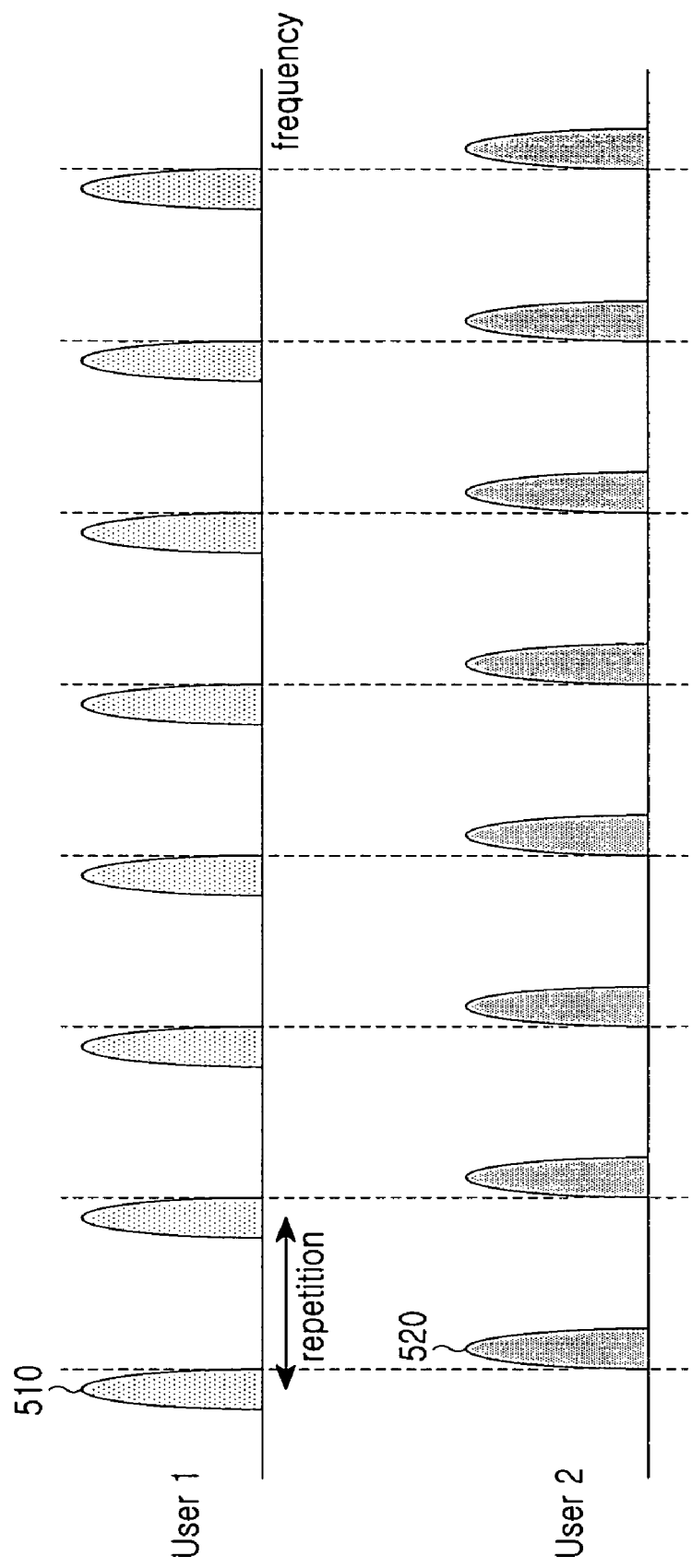
FIG. 5 is a diagram illustrating symbols transmitted in a frequency band by the transmitter of FIG. 4 according to the present invention.

The communication system of FIG. 4, compared with the communication system of FIG. 2, further includes the repeater 405 in the transmitter, and the repeater 405 spaces symbols at regular intervals as described above. The repeater 405 arranges the symbols output from the symbol mapper 403 at regular intervals such that the symbols should not be adjacent to each other in the frequency band. In order to arrange the symbols in the frequency band at regular intervals, the repeater 405 repeatedly processes the input signal in the time band a predetermined number of times, and '0' is inserted between transmission samples of the signal, received as many times as the number of repetitions of the repeater 405. For example, if the number of repetitions of the repeater 405 is four, four '0's are inserted in each interval between the transmission samples. If the transmission samples, between which '0's are inserted in the time band, are represented as symbols in the frequency band, the symbols are arranged in such a way that they are spaced apart at regular intervals as described above. A regular interval occurs by the '0's inserted between the samples in the time band, and transmission samples of another input signal can be inserted in the regular interval, i.e. in the positions where the '0's are inserted. With reference to FIG. 5, a detailed description will now be made of the repeater 405.

FIG. 5 shows symbols transmitted in a frequency band by the transmitter in the communication system of FIG. 4 according to the present invention. It is assumed in FIG. 5 that the transmitter transmits eight symbols in the frequency band.

Referring to FIG. 5, if the data to be transmitted to a user 1 is input to the bit generator 401 as described in FIG. 4, the transmitter performs the above-described signal processing on the input data, and transmits eight symbols 510 through the RF transmitter 411 using an RF frequency. In addition, if the data to be transmitted to a user 2 is input to the bit generator 401, the transmitter transmits eight symbols 520 through the RF transmitter 411 using an RF frequency.

The eight symbols 510 for the user 1 and the eight symbols 520 for the user 2 are transmitted over different spaces in the frequency band. That is, the transmitter divides the space into a space for the eight symbols 510 associated with the user 1 and a space for the eight symbols 520 associated with the user 2 in the same frequency band, and then transmits the eight symbols 510 and the eight symbols 520 over their associated divided spaces. The eight symbols 510 and the eight symbols 520 are spaced apart at regular intervals by the repeater 405 of the transmitter, and a spaced interval between the symbols is determined depending on the number of repetitions of the repeater 405. More specifically, as the number of repetitions of the repeater 405 increases, the number of '0's inserted between transmission samples in the time band increases as described above, and if the inserted '0' is shown in the frequency band, it becomes the spaced interval between the symbols. As a result, the spaced interval between the symbols increases. The space where it can be divided in the frequency band increases due to the increased interval. As the space where it can be divided in the frequency band increases in this way, it is possible to transmit symbols corresponding to more users through the increased space in the frequency band. For example, if the number of repetitions of the repeater 405 is four, the number of '0's inserted between transmission samples in the time band is four, and as the positions where '0's are inserted are shown at regular intervals in the frequency band, eight symbols for four users can be inserted in the positions where '0's can be inserted.

Because the space where it can be divided in the frequency band has a predetermined size, the symbols for the users, which can be transmitted in the frequency band, also have a predetermined size by increasing the number of repetitions of the repeater 405. That is, if the number of symbols for one user in the frequency band is small, it is possible to transmit symbols corresponding to more users by increasing the number of repetitions of the repeater 405. If the number of symbols for one user in the frequency band is large, because the number of repetitions of the repeater 405 is smaller than the former case, the number of users is also smaller than the former case.

In the following description, it will be assumed that a single-carrier communication system with two transmission antennas and one reception antenna transmits/receives SFBC signals based on the FDE scheme shown in FIG. 4.

Figure 6:
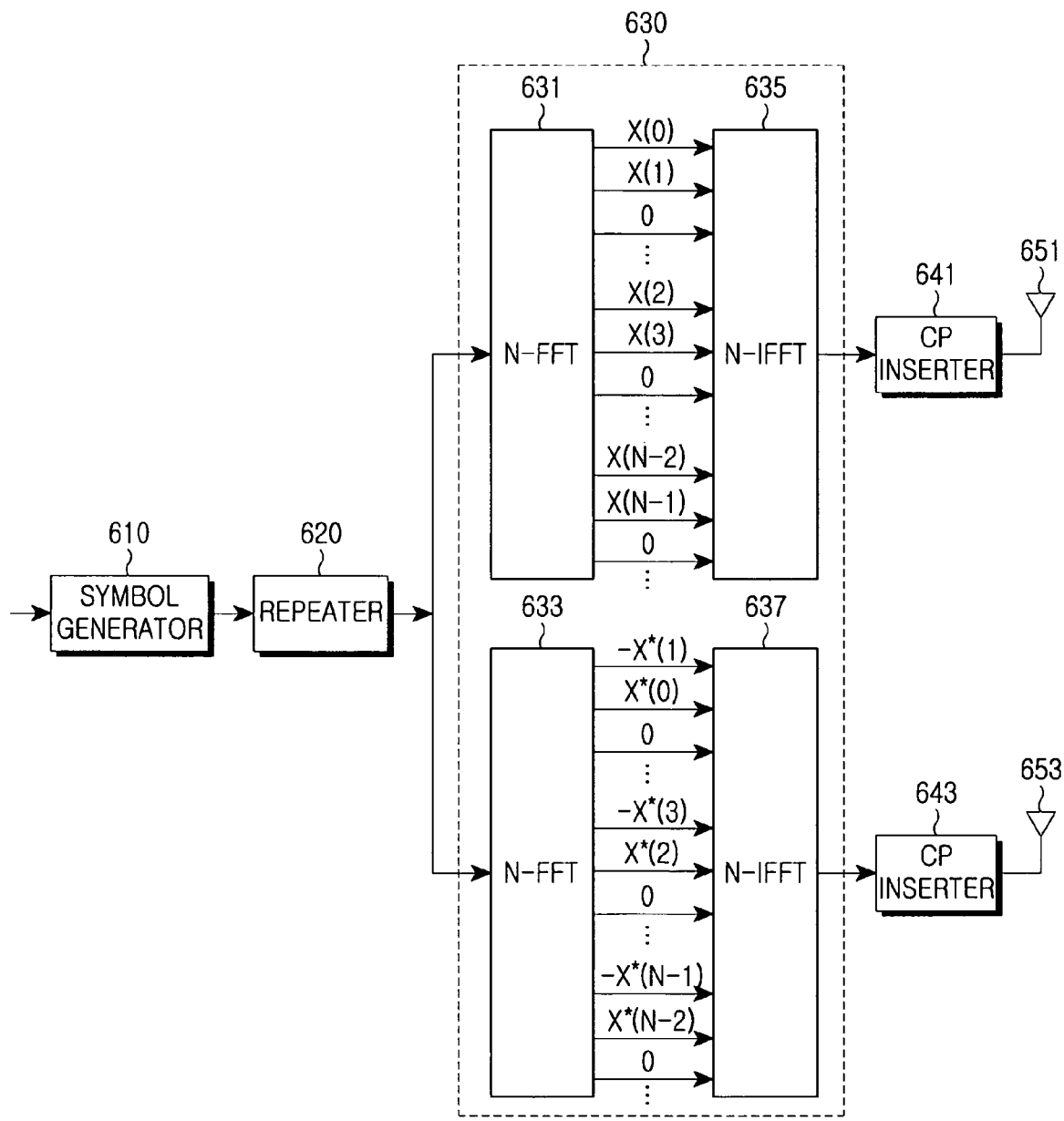
FIG. 6 is a diagram illustrating a structure of a transmitter in a communication system according to of the present invention.

FIG. 6 shows a transmitter in a communication system with two antennas. If the data to be transmitted to a user, i.e. the data to be transmitted to a receiver, is input to the bit generator 401 of the transmitter as shown in FIG. 4, the bit generator 401 outputs a bit stream to the symbol mapper 403, and the symbol mapper 403 maps the bit stream to a fixed-length symbol, and then delivers the mapped bit stream to a symbol generator 610. Then the symbol generator 610 outputs symbols. The symbols output from the symbol generator 610 are delivered to a repeater 620, and the symbols are arranged at regular intervals by the repeater 620 such that they should not be adjacent to each other in the frequency band. The symbols output from the repeater 620 are processed into two signal streams by a signal processor 630 including a pair of FFT units 631 and 633 and a pair of IFFT units 635 and 637 associated with the FFT units 631 and 633. A CP is inserted in each signal stream by an associated CP inserter 641 and 643), and the CP-inserted signal stream is transmitted via an associated transmission antenna 651 and 653).

The signal transmission of the transmitter represents transmission in a time band other than a frequency band, and because the communication system processes the transmission sequence in the time band in such a way, the signal processor 630 introduces the concept in which the communication system generates single-carrier transmission signals in the time band using the SFBC scheme. Of the two signal streams output from the pair of the FFT units 631 and 633, the signal stream X(0), X(1), 0, . . . , X(2), X(3), 0, . . . , X(n−2), X(n−1), 0, . . . corresponding to the first antenna 651 and the signal stream −X*(1), X*(0), 0, . . . , −X*(3), X*(2), 0, . . . , −X*(n−1), X*(n−2), 0, . . . corresponding to the second antenna 653 are conjugate to each other.

'0' in the two signal streams represents a regular interval between symbols by the repeater 620 when the symbols are transmitted via the first antenna 651 and the second antenna 653 in the frequency band. For example, when the symbols are transmitted via the first antenna 651 in the frequency band, symbols X(0) and X(1) are transmitted with adjacent sub-carriers, and symbols X(2) and X(3) are also transmitted with adjacent sub-carriers. A regular interval between the symbol pair X(0) and X(1) and the symbol pair X(2) and X(3) transmitted with the adjacent sub-carriers is a symbol of '0' between the symbol pair X(0) and X(1) and the symbol pair X(2) and X(3) in the signal stream. That is, as the number of '0's existing between signals in the signal stream is larger, the interval between symbols in the frequency band increases.

In order to arrange symbol pairs in the frequency band at regular intervals, the repeater 620 repeatedly processes a signal input in the time band a number of times, and '0's are inserted between transmission sample pairs, i.e. a sample pair X(0) and X(1), a sample pair X(2) and X(3), . . . , a sample pair X(n−2) and X(n−1), and a sample pair −X*(1) and X*(0), a sample pair −X*(3) and X*(2), . . . , a sample pair −X*(n−1) and X*(n−2), of transmission symbols of the signal input as many times as the number of repetitions of the repeater 620. For example, if the number of repetitions of the repeater 620 is 4, 4 pairs of '0's, i.e. 8 '0's, are inserted between the transmission sample pairs. If the transmission sample pairs between which '0's are inserted in the time band are shown as symbols in the frequency band, the symbols are arranged between the symbol pairs at regular intervals as described above. Therefore, it is possible to insert input signals of other users in the positions of '0's inserted in the transmission sample pairs before transmission.

If an $n^{th}$ symbol of a signal block transmitted from an $i^{th}$ antenna is denoted by $x_i(n)$, a symbol $x_1(n)$ transmitted via the first antenna 651 can be expressed as Equation (3)

$$x_1(n) = \frac{1}{\sqrt{N}} \sum_{k=0}^{N-1} X_1(k) W_N^{-nk} \qquad (3)$$

$$= \frac{1}{\sqrt{N}} \sum_{v=0}^{\frac{N}{2}-1} (X_1(2v) + W_N^{-n} X_1(2v+1)) W_{\frac{N}{2}}^{-nv}$$

$$= \frac{1}{\sqrt{N}} \sum_{l=0}^{\frac{N}{2L}-1} (X_1(2Ll) + W_N^{-n} X_1(2Ll+1)) W_{\frac{N}{2L}}^{-nl}$$

-continued $$= \frac{1}{\sqrt{N}} \sum_{l=0}^{\frac{N}{2L}-1} X_1(2Ll) + W_N^{-nl} \frac{1}{\sqrt{N}} W_N^{-n} \sum_{l=0}^{\frac{N}{2L}-1} X_1(2Ll+1) \cdot W_{\frac{N}{2L}}^{-nl}$$

$$= \frac{1}{\sqrt{N}} (x^e(n) + W_N^{-n} x^o(n)), n = 0, \dots, N-1$$

In Equation (3), Q denotes the number of symbols transmitted via one antenna. If the one antenna transmits symbols corresponding to a plurality of users, it indicates the number of symbols associated with each user. Further, L denotes an interval between symbols depending on the number of repetitions of the repeater 620, i.e. depending on the symbols by the repeater 620. Thus, L indicates the number of users associated with the symbols transmitted by the antenna. In addition, N denotes a size of the FFT unit pair 631 and 633, and if N is defined as N=Q·L, $W_N$ is defined as $$W_N = e^{-j\frac{2\pi}{N}}.$$

In addition, $x^e(n)$ and $x(n)$ in Equation (3) are defined in Equation (4) as $$x^e(n) = \sum_{l=0}^{\frac{N}{2L}-1} X_1(2Ll) \cdot W_{\frac{N}{2L}}^{-nl}, \ x^o(n) = \sum_{l=0}^{\frac{N}{2L}-1} X_1(2Ll+1) \cdot W_{\frac{N}{2L}}^{-nl} \qquad (4)$$

The $x^e(n)$ and the $x^o(n)$ have a period of N/2 for n, and when the transmitter is actually implemented, the signal processor 630 separates the $x^e(n)$ and the $x^o(n)$ as shown in Equation (5) below, using a demultiplexer for demultiplexing the symbols output from the repeater 620.

$$x^e(l) = x(2l), \ x^o(l) = x(2l+1), \ l = 0, 1, \dots, \frac{N}{2L} - 1 \qquad (5)$$

Because the transmitter uses block coding for 2 adjacent sub-carriers and 2 transmission antennas at the rear stages of the FFT units 631 and 633 included in the signal processor 630, time-band transmission samples of the transmission antennas 651 and 653, output through the IFFT units 635 and 637, can be generated using the output symbols of the repeater 620 through the symmetry property of FFT as shown in Equation (6) below.

$$x^*(-n)_N \Leftrightarrow X^*(k), n, k=0, 1, \dots, N-1 \qquad (6)$$

A symbol $x_2(n)$ transmitted via the second antenna 653 using Equation (4) to Equation (6) described in connection with Equation (3) indicating a symbol $x_1(n)$ transmitted via the first antenna 651 can be represented by Equation (7)

$$x_2(n) = \frac{1}{\sqrt{2}} \left( -x^o \left( (-n)_{\frac{N}{2L}} \right)^* + W_N^{-n} \left( x^e \left( (-n)_{\frac{N}{2L}} \right) \right)^* \right), \qquad (7)$$

$$n = 0, 1, \dots, N-1$$

That is, the symbols $x_1(n)$ and $x_2(n)$ transmitted via the first antenna 651 and the second antenna 653 can be represented by Equation (8)

$$x_1(n) = \frac{1}{\sqrt{2}} \left( x^e \left( (n)_{\frac{N}{2L}} \right) + W_N^{-n} x^o \left( (n)_{\frac{N}{2L}} \right) \right), n = 0, 1, \ldots, N-1 \quad (8)$$

$$x_2(n) = \frac{1}{\sqrt{2}} \left( -\left( x^o \left( (-n)_{\frac{N}{2L}} \right) \right)^* + W_N^{-n} \left( x^e \left( (-n)_{\frac{N}{2L}} \right) \right)^* \right),$$

$$n = 0, 1, \ldots, N-1$$

$x^e(n)$ and $x^o(n)$ are defined by Equation (4), and $$x(n)_{\frac{N}{2L}}$$

of above equations including Equation (8) is defined as $$x(n)_{\frac{N}{2L}} = x(k),$$

where k is defined as $$k = \mathrm{mod}\left(n, \frac{N}{2L}\right)$$

and is a value obtained by performing a modulo operation on n with N/2L. In addition, Q, L and N of Equation (8) are equally defined as done in Equation (3).

In this way, the transmitter transmits the symbols shown in Equation (8) via the first antenna 651 and the second antenna 653 with a single carrier. In particular, from the symbols transmitted via the second antenna 653, the transmitter can determine that the communication system can transmits signals using the SFBC scheme.

Figure 7:
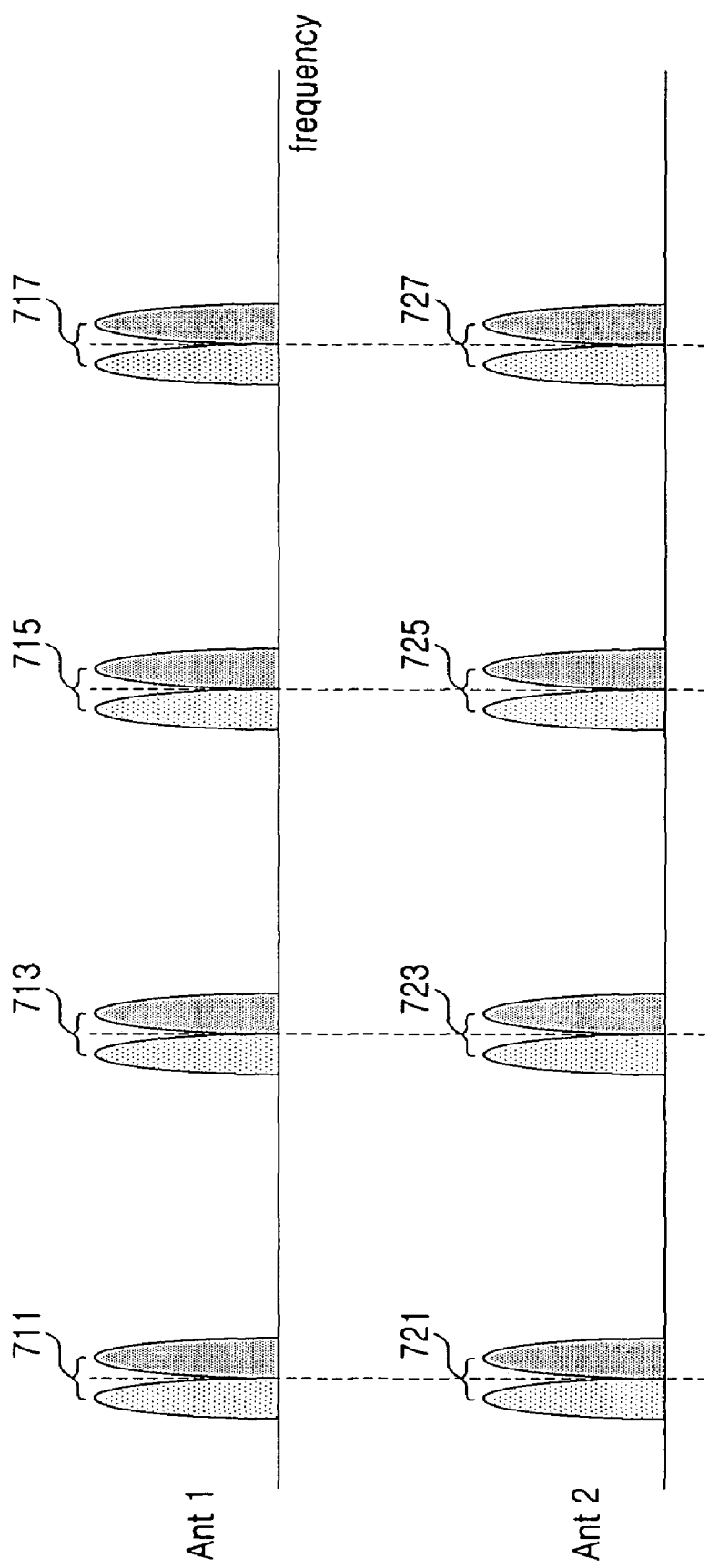
FIG. 7 is a diagram illustrating symbols transmitted in a frequency band by the transmitter of FIG. 6 according to the present invention.

FIG. 7 shows symbols transmitted in a frequency band by the transmitter in the communication system of FIG. 6 according to the present invention. It is assumed that the first antenna 651 and the second antenna 653 of the transmitter each transmit four pairs of symbols through adjacent sub-carriers in the frequency band.

Referring to FIG. 7, if the data to be transmitted to a user is input to the symbol generator 610 as shown in FIG. 6, the transmitter performs the above-described signal processing on the input data, and transmits four pairs of symbols (711, 713, 715, 717) and (721, 723, 725, 727) via the first antenna 651 and the second antenna 653 using an RF frequency. The symbols (711, 713, 715, 717) and (721, 723, 725, 727) of the four pairs, transmitted via the first antenna 651 and the second antenna 653, are symbols transmitted to one receiver, i.e. one user, and symbols of each pair (for example, 711 and 713) are transmitted through adjacent sub-carriers. In addition, the four pairs of symbols transmitted via each antenna are transmitted over the same space in the same frequency band. That is, symbols (711 and 721), (713 and 723), (715 and 725), and (717 and 727) of the corresponding pairs are transmitted over the same space and with the same adjacent sub-carriers in the frequency band, except that they are transmitted via different antennas.

In addition, the transmitter divides the symbols to be transmitted to one user into four symbol pairs 711, 713, 715 and 717 to be transmitted via the first antenna 651 and four symbol pairs 721, 723, 725 and 727 to be transmitted via the second antenna 653, and symbols of the four pairs to be transmitted via the corresponding antenna by the repeater 620 of the transmitter are spaced apart at regular intervals. The spaced interval between the symbol pairs is determined depending on the number of repetitions of the repeater 620. More specifically, as the number of repetitions of the repeater 620 increases, the number of '0's inserted between transmission sample pairs in the time band increases as described above, and if the inserted '0' is shown in the frequency band, it becomes the spaced interval between the symbol pairs. As a result, the spaced interval between the symbol pairs increases. The space where it can be divided in the frequency band increases due to the increased interval. As the space where it can be divided in the frequency band increases in this way, it is possible to transmit symbol pairs corresponding to more users through the increased space in the frequency band. For example, if the number of repetitions of the repeater 620 is four, it is possible to transmit four symbol pairs corresponding to the four users via each of the first antenna 651 and the second antenna 653 in the frequency band.

Because the space where it can be divided in the frequency band has a predetermined size, the symbol pairs for the users, which can be transmitted in the frequency band, also have a predetermined size by increasing the number of repetitions of the repeater 620. That is, if the number of symbol pairs for one user in the frequency band is small, it is possible to transmit symbol pairs corresponding to more users via each of the first antenna 651 and the second antenna 653 by increasing the number of repetitions of the repeater 620. If the number of symbol pairs for one user in the frequency band is large, because the number of repetitions of the repeater 620 is smaller than the former case, the number of users is also smaller than the former case.

Figure 8:
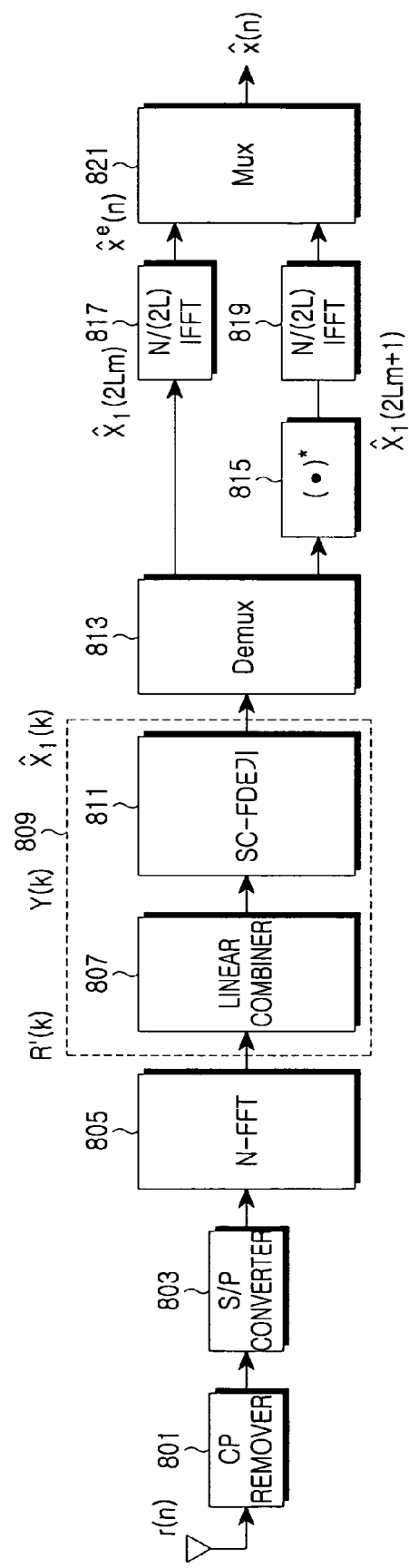
FIG. 8 is a diagram illustrating a structure of a receiver in a communication system according to the present invention.

FIG. 8 shows a receiver in a communication system according to the present invention. The receiver corresponds to the structure of the transmitters of FIGS. 3 and 6, and the communication system has two transmission antennas and one reception antenna. Referring to FIG. 8, the receiver includes a CP remover 801 for removing a CP of the signal output from the A/D converter 415, received via the reception antenna and the RF receiver 413 as described in FIG. 4, a serial-to-parallel (S/P) converter 803 for S/P-converting the output signal of the CP remover 801, a size-N FFT unit 805 for performing an FFT process on the parallel signal output from the S/P converter 803, a signal detector 809 for detecting a transmission signal from the output signal of the FFT unit 805, a demultiplexer (DEMUX) 813 for demultiplexing the signal detected by the signal detector 809, a complex conjugate transposer 815 for performing complex conjugate transposition on (or for conjugating) the odd frequency band detection signal in the signal output from the demultiplexer 813, a first size-N/2 IFFT unit 817 for performing an IFFT process on the even frequency band detection signal in the signal output from the demultiplexer 813, a second size-N/2 IFFT unit 819 for performing an IFFT process on the output signal of the complex conjugate transposer 815, and a multiplexer (MUX) 821 for multiplexing the output signals of the first IFFT unit 817 and the second IFFT unit 819.

The signal detector 809 includes a linear combiner 807 for combining the output signals of the FFT unit 805, and a Single Carrier FDE (SC-FDE) unit 811 for performing an FDE process on the output signal of the linear combiner 807. The multiplexed signal is output as a bit stream through the symbol demapper 425, and the signal determiner 427 for determining a transmission signal for the bit stream, outputs the transmission signal.

The linear combiner 807 of the signal detector 809 detects a signal using a Minimum Mean Square Error (MMSE) combining technique, and the detected signal is defined in Equation (9) as $$r = H_1 x_1 + H_2 x_2 + n \qquad (9)$$

In Equation (9), $H_1$ and $H_2$ are channel matrixes for the first antenna 651 and the second antenna 653 of FIG. 6, respectively. If the frequency band signal obtained by multiplying the r of Equation (9) by an FFT matrix W is divided into even and odd frequency components, they can be expressed in Equations (10) and (11) as $$\begin{aligned} R(2m) &= \Lambda_1(2m) X_1(2m) + \Lambda_2(2m) X_2(2m) + N(2m) \\ &= \Lambda_1(2m) X_1(2m) - \Lambda_2(2m) X_1^*(2m+1) + N(2m), \\ m &= 0, 1, \ldots, N/2 - 1 \end{aligned} \qquad (10)$$

$$\begin{aligned} R(2m+1) &= \Lambda_1(2m+1) X_1(2m+1) + \Lambda_2(2m+1) X_2(2m+1) + \\ & \quad N(2m+1) \\ &= \Lambda_1(2m+1) X_1(2m+1) + \Lambda_2(2m+1) X_1^*(2m) + N(2m+1) \end{aligned} \qquad (11)$$

Assuming that channel information for two adjacent sub-carriers is constant, Equation (10) and Equation (11) can be rewritten as a determinant of Equation (12) below.

$$R_m = \begin{bmatrix} R(2m) \\ R^*(2m+1) \end{bmatrix} \qquad (12)$$

From Equation (12), the received signal can be expressed as a liner combination of the transmission signals. In addition, the signal detection is performed based on the Minimum Mean Square Error (MMSE) criterion. Accordingly, a similar formula of a reception diversity system using the Maximum Ratio Combining (MRC) of the path received from the finally found optimal two branches, i.e. two transmission antennas, can be expressed in Equation (13) as $$Y_m = H_m^H R_m \qquad (13)$$

$$\hat{X}_m = \begin{bmatrix} \hat{X}_1(2m) \\ \hat{X}_1(2m+1) \end{bmatrix} = \left( H_m^H H_m + \frac{1}{SNR} I_2 \right)^{-1} Y_m$$

$$H_m = \begin{bmatrix} H_1(2m) & -H_2(2m) \\ H_2^*(2m) & H_1^*(2m) \end{bmatrix}$$

In Equation (13), $Y_m$ denotes a received signal corresponding to $2m^{th}$ and $(2m+1)^{th}$ sub-carriers, i.e. adjacent sub-carriers, $H_m$ denotes a value of the channel that the received signal experiences through $2m^{th}$ and $(2m+1)^{th}$ sub-carriers, $H_1(2m)$ denotes, among $H_m$, a value of the channel that the signal transmitted via the first antenna experiences, and $H_2(2m)$ denotes, among $H_m$, a value of the channel that the signal transmitted via the second antenna experiences. In addition, $H_m^H$ denotes a Hermitian operation of the $H_m$.

Although the channel equalization performed in such a way by the linear combiner 807 and the SC-FDE unit 811 is performed in the frequency domain, the determined values are obtained in the time domain, so an estimated value for the symbol transmitted to the receiver can be represented by Equation (14)

$$\hat{X}^e = W_{\frac{N}{2}}^H \hat{x}^e, \qquad (14)$$

$$\hat{X}^o = W_{\frac{N}{2}}^H \hat{x}^o$$

$$\hat{x} = \left[ \hat{x}^e(0), \hat{x}^o(0), \hat{x}^e(1), \hat{x}^o(1), \ldots, \hat{x}^e\left(\frac{N}{2}-1\right), \hat{x}^o\left(\frac{N}{2}-1\right) \right]^T$$

Through Equation (14), the receiver estimates the symbols transmitted by the transmitter via two transmission antennas, and then delivers the estimated values to the symbol demapper 425. Then the symbol demapper 425 demaps the estimated values into bit streams, and delivers the bit streams to the signal determiner 427, thereby performing predetermined signal processing.

As can be understood from the foregoing description, the present invention allows an SC-FDE system to use SFBC in the communication system, thereby securing the advantages of the SFBC and SC-FDE that they are robust against non-linear distortion or a carrier synchronization error and have a transmission diversity gain, and contributing to minimization of performance degradation even in the fast fading environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a communication system, the method comprising the steps of: repeatedly processing an input signal a number of times;
   performing Space-Frequency Block-Coded (SFBC) coding on the repeatedly processed input signals and outputting at least two signal blocks in parallel; and
   inserting a cyclic prefix (CP) in the signal blocks and transmitting the CP-inserted signal blocks via associated transmission antennas using a single carrier,
   wherein the step of outputting at least two signal blocks in parallel comprises: demultiplexing the repeatedly processed input signals including N input samples into even transmission samples and odd transmission samples, each sample having a period of N/2;
   making transmission sample pairs using adjacent even transmission samples and odd transmission samples among the separated even transmission samples and odd transmission samples;
   inserting '0's between the transmission sample pairs according to the number of repetitions; and
   generating the first signal block and the second signal block using the '0'-inserted even transmission sample pairs and odd transmission sample pairs.

2. The method of claim 1, wherein the step of generating a first signal block comprises:
   performing a modulo calculation on odd transmission sample pairs and even transmission sample pairs individually for each of the N input samples;
   generating a phase shifted signal by multiplying each of the modulo-calculated odd transmission sample pairs by a phase shift coefficient;
   generating an accumulated signal by adding the phase shifted signal and the modulo-calculated even transmission sample pairs;
   generating a normalized signal by multiplying the accumulated signal by a normalization coefficient; and generating the first signal block by mapping the generated normalized signal to the N input samples.

3. The method of claim 1, wherein the step of generating a second signal block comprises:
performing a modulo calculation on odd transmission sample pairs and even transmission sample pairs individually for each of the N input samples;
generating a complex conjugate signal by performing a complex conjugation operation on the modulo-calculated odd transmission sample pairs and even transmission sample pairs;
generating a phase shifted signal by multiplying the complex conjugate signal for the even transmission sample pairs by a phase shift coefficient;
generating an accumulated signal by adding the phase shifted signal and the complex conjugate signal for the odd transmission sample pairs;
generating a normalized signal by multiplying the accumulated signal by a normalization coefficient; and
generating the second signal block by mapping the generated normalized signal to the N input samples.

4. The method of claim 2, wherein the step of generating a first signal block comprises:
repeatedly processing another input signal the number of times;
demultiplexing the repeatedly processed N other input samples into even transmission samples and odd transmission samples, each sample having a period of N/2;
making transmission sample pairs using adjacent even transmission samples and odd transmission samples among the separated even transmission samples and odd transmission samples;
inserting transmission sample pairs of the other input signal corresponding to positions of the '0's inserted between the transmission sample pairs; and
generating the first signal block and the second signal block using the even transmission sample pairs and the odd transmission sample pairs where the transmission sample pairs of the other input signal are inserted.

5. The method of claim 3, wherein the step of generating a second signal block comprises:
repeatedly processing another input signal the number of times;
demultiplexing the repeatedly processed other input signals including N samples into even transmission samples and odd transmission samples, each sample having a period of N/2;
making transmission sample pairs using adjacent even transmission samples and odd transmission samples among the separated even transmission samples and odd transmission samples;
inserting transmission sample pairs of the other input signal corresponding to positions of the '0's inserted between the transmission sample pairs; and
generating the first signal block and the second signal block using the even transmission sample pairs and the odd transmission sample pairs where the transmission sample pairs of the other input signal are inserted.

6. An apparatus for transmitting data in a communication system, the apparatus comprising: a repeater for repeatedly processing an input signal a predetermined number of times;
a Space-Frequency Block-Coded (SFBC) encoder for performing SFBC coding on the repeatedly processed input signals, and outputting at least two signal blocks in parallel; and
a cyclic prefix (CP) inserter for inserting a CP in the signal blocks and transmitting the CP-inserted signal blocks via associated transmission antennas using a single carrier,
wherein the SFBC encoder comprises: a demultiplexer for demultiplexing the repeatedly processed input signals including N input samples into even transmission samples and odd transmission samples, each sample having a period of N/2;
a signal processor for making transmission sample pairs using adjacent even transmission samples and odd transmission samples among the separated even transmission samples and odd transmission samples;
a '0' inserter for inserting '0's between the transmission sample pairs according to the number of repetitions; and
a signal block generator for generating a first signal block and a second signal block using the '0'-inserted even transmission sample pairs and odd transmission sample pairs.

7. The apparatus of claim 6, wherein the signal block generator comprises N signal processing modules for processing a first input signal of the '0'-inserted odd transmission samples and transmission sample pairs and a second input signal of the '0'-inserted even transmission samples and transmission sample pairs.

8. The apparatus of claim 7, wherein each signal processing module comprises:
an operator for performing a modulo operation on the first input signal and the second input signal individually, and outputting a first modulo signal and a second modulo signal;
a first multiplier for generating a first phase shifted signal by multiplying the first modulo signal by a phase shift coefficient;
a first adder for generating a first accumulated signal by adding the first phase shifted signal and the second modulo signal;
a second multiplier for generating a first normalized signal by multiplying the first accumulated signal by a normalization coefficient;
a complex conjugate module for generating a complex conjugate signal by performing a complex conjugation operation on the first modulo signal and the second modulo signal;
a third multiplier for generating a second phase shifted signal by multiplying the complex conjugate signal for the second modulo signal by a phase shift coefficient;
a second adder for generating a second accumulated signal by adding the second phase shifted signal and the complex conjugate signal for the first modulo signal; and
a fourth multiplier for generating a second normalized signal by multiplying the second accumulated signal by a normalization coefficient.

9. The apparatus of claim 8, wherein the first signal block is generated by mapping the first normalized signal to the N input samples.

10. The apparatus of claim 8, wherein the second signal block is generated by mapping the second normalized signal to the N input samples.

11. The apparatus of claim 8, wherein the first modulo signal is output by performing a modulo operation on the first input signal, and the second modulo signal is output by performing a modulo operation on the second input signal.

12. The apparatus of claim 6, wherein the signal block generator comprises N signal processing modules for processing a first input signal of the '0'-inserted odd transmission samples and transmission sample pairs and a second input signal of the '0'-inserted even transmission samples and transmission sample pairs.

13. The apparatus of claim 12, wherein each signal processing module comprises:
   an operator for performing a modulo operation on the first input signal and the second input signal individually, and outputting a first modulo signal and a second modulo signal;
   a first multiplier for generating a first phase shifted signal by multiplying the first modulo signal by a phase shift coefficient;
   a first adder for generating a first accumulated signal by adding the first phase shifted signal and the second modulo signal;
   a second multiplier for generating a first normalized signal by multiplying the first accumulated signal by a normalization coefficient;
   a complex conjugate module for generating a complex conjugate signal by performing a complex conjugation operation on the first modulo signal and the second modulo signal;
   a third multiplier for generating a second phase shifted signal by multiplying the complex conjugate signal for the second modulo signal by a phase shift coefficient;
   a second adder for generating a second accumulated signal by adding the second phase shifted signal and the complex conjugate signal for the first modulo signal; and
   a fourth multiplier for generating a second normalized signal by multiplying the second accumulated signal by a normalization coefficient.

14. The apparatus of claim 12, wherein the first signal block is generated by mapping the first normalized signal to the N input samples.

15. The apparatus of claim 12, wherein the second signal block is generated by mapping the second normalized signal to the N input samples.

16. The apparatus of claim 12, wherein the first modulo signal is output by performing a modulo operation on the first input signal, and the second modulo signal is output by performing a modulo operation on the second input signal.

* * * * *